(12) United States Patent  
Khosla et al.

(10) Patent No.: US 8,369,652 B1  
(45) Date of Patent: Feb. 5, 2013

(54) VISUAL ATTENTION SYSTEM FOR SALIENT REGIONS IN IMAGERY

(75) Inventors: Deepak Khosla, Camarillo, CA (US);  
David J. Huber, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 750 days.

(21) Appl. No.: 12/584,744

(22) Filed: Sep. 11, 2009

Related U.S. Application Data

(63) Continuation-in-part of application No. 12/214,259, filed on Jun. 16, 2008.

(51) Int. Cl.  
*G06K 9/36* (2006.01)

(52) U.S. Cl. .................................................. 382/284

(58) Field of Classification Search ................. None  
See application file for complete search history.

(56) References Cited

U.S. PATENT DOCUMENTS

| | | | |
|---|---|---|---|
| 6,670,963 B2 | 12/2003 | Osberger | |
| 8,165,407 B1 * | 4/2012 | Khosla et al. | 382/224 |
| 2005/0047647 A1 | 3/2005 | Rutishauser et al. | |
| 2006/0215922 A1 * | 9/2006 | Koch et al. | 382/248 |
| 2007/0173699 A1 | 7/2007 | Mathan et al. | |
| 2007/0236488 A1 | 10/2007 | Mathan et al. | |
| 2008/0056611 A1 | 3/2008 | Mathan et al. | |
| 2008/0080787 A1 * | 4/2008 | Yang et al. | 382/284 |

FOREIGN PATENT DOCUMENTS

WO  WO 03/093947  11/2003

OTHER PUBLICATIONS

B. Draper and A. Lionelle, "Evaluation of Selective Attention under Similarity Transforms," in Workshop on Performance and Attention in Computer Vision, Graz, Austria, Apr. 2003.

L. Itti and C. Koch, "A saliency-based search mechanism for overt and covert shifts of visual attention," Vision Research, 40: 1489-1506, 2000.

L. Itti, C. Koch, and E. Niebur, "A Model of saliency-based visual attention for rapid scene analysis," IEEE Transactions on Pattern Analysis and Machine Intelligence, 20, 1254-1259, 1998.

V. Navalpakkam, L. Itti, "Modeling the influence of task on attention," Vision Research, 45: 205-231, 2005.

V. Navalpakkam, and L. Itti, "An integrated model of top-down and bottom-up attention for optimal object detection," In: Proc. IEEE Conference on Computer Vision and Pattern Recognition (CVPR), 1-7, 2006.

F. Orabona, G. Metta, and G. Sandini, "Object-based visual attention: a model for a behaving robot," In 3rd International Workshop on Attention and Perfonmance in Computational Vision (in CVPR 2005), San Diego, CA, Jun. 2005.

Andoni A., et al., "Near-Optimal Hashing Algorithms for Near Neighbor Problem in High Dimensions," Proceedings of the Symposium on Foundations of Computer Science (FOCS'06), 2006.

Bentin, S., et al., "Electrophysiological studies of face perception in humans," Journal of Cognitive Neuroscience, 8, 551-565, 1996.

Berg A., "Shape matching and object recognition," Ph.D. thesis, UC Berkeley, Computer Science Division, Berkeley, CA, Dec. 2005.

(Continued)

*Primary Examiner* — Andrew W Johns  
*Assistant Examiner* — Siamak Harandi  
(74) *Attorney, Agent, or Firm* — Tope-McKay & Associates

(57) ABSTRACT

Described is a system for finding salient regions in imagery. The system improves upon the prior art by receiving an input image of a scene and dividing the image into a plurality of image sub-regions. Each sub-region is assigned a coordinate position within the image such that the sub-regions collectively form the input image. A plurality of local saliency maps are generated, where each local saliency map is based on a corresponding sub-region and a coordinate position representative of the corresponding sub-region. Finally, the plurality of local saliency maps is combined according to their coordinate positions to generate a single global saliency map of the input image of the scene.

25 Claims, 6 Drawing Sheets

OTHER PUBLICATIONS

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Richard P. Wildes, "A measure of motion salience for surveillance applications" in Proc. IEEE Int'l Conf. Image Processing,1998.

Eckhorn R., et al., "Coherent Oscillations: A Mechanism of feature linking in the visual cortex?" Biological Cybernetics 60, 121-130, 1988.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Gerson, A.D., et al., "Cortically coupled computer vision for rapid image search," IEEE Transactions on Neural Systems and Rehabilitation Engineering, 14(2): 174-179, Jun. 2006.

Gladwell, M., "Blink: the power of thinking without thinking," 1st ed. Little, brown and company: Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Gray C.M., et al., "Oscillatory Responses in Cat visual cortex exhibit intercolumnar synchronization which reflects global stimulus properties," Nature 338: 334-336, 1989.

Hopf, J.-M., et al., "Localizing visual discrimination processes in time and space," The American Physiological Society, 88, 2088-2095, 2002.

Zang H., et al., "SVM-KNN: Discriminative nearest neighbor classification for visual category recognition," CVPR 2006.26. Vazirani, V., "Approximation algorithms," Springer-Verlag, Berlin, Germany, p. 32, 2004.

Yamaguchi, S., et al., "Cerebral Asymmetry of the 'Top-down' allocation of attention to global and local features," The Journal of Neuroscience, 20, 1-5, 2000.

Itti L., et al., "Bayesian Surprise Attracts Human Attention," Vision Research 49: 1295-1306, 2008.

Itti, L, et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13 (1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Nane S.A., et al., "Columbia Object Image Library (COIL-100)," Technical Report CUCS-006-96, Feb. 1996.

Vogel, E.K., et al., "The Visual NI Component as an index of a discrimination process," Psychophysiology, 2000.

Vazirani, V., "Approximation Algorithms," Springer-Verlag, Berlin, Germany. pp. 32-33 (2004).

Navalpakkam V., et al., "Sharing resources: buy attention, get recognition," In: Proc. International Workshop on Attention and Performance in Computer Vision (WAPCV'03), Graz, Austria, Jul. 2003.

Navalpakkam, V, et al., "Search goal tunes visual features optimally," Neuron, 53, 605-617, 2007.

Niebur E., at al., "Control of selective visual attention: modeling the 'where' pathway," in D. Touretzky, M Mozer and M. Hasselmo. Neural Imformation Processing Systems (NIPS 8), 802-808, Cambridge, MA, MIT, Press 1996.

Wolfe J.M., "Visual Search in continuous, naturalistic stimuli," Vision Research 34: 1187-1195, 1994.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery," IEEE Swarm Intelligence Symposium, 2005.

Peters, R.J., et al, "Beyond bottom-up: Incorporating task-dependent influences into computational model of spatial attention," in: Proc. IEEE Conference on Computer Vision and Pattern Recognition (CVPR), 2007.

Rogowitz, B.E., et al., "Perceptual image similarity experiments," Proceedings of SPIE, 3299: 576-590, 1998.

Scholl B.J., "Objects and Attention: the state of the art," Cognition 80, 1-46, 2001.

Serre T., et al., "Object recognition with features inspired by visual cortex," in Proceedings of the IEEE conference on computer vision and pattern recognition (CVPR), San Diego, CA, Jun. 2005.

Smeulders, A., et al., "Content-based image retrieval at the end of the early years," IEEE Transactions on PAMI, 22(12): 1349-1380, 2000.

Sun Y., et al., "Hierarchical selectivity for object-based visual attention," Submitted to Artificial Intelligence, 2004.

Sun, Y., et al., "Probabilistic judgment by a coarser scale: behavioral and ERP evidence," in Proceedings of the Twenty-sixth Annual meeting of the Cognitive Science Society, 2004.

Thorpe, S., et al., "Speed of processing in the human visual system," Nature, vol. 381, pp. 520-522, 1996.

University of California, San Diego Complex Systems and Cognition Laboratory, CSCLAB Image Database http://csclab.ucsd.edu/labeledimages.php. 2006.

Walther D., et al, "Attentional selection for object recognition—a gentle way," Lecture Notes in Computer Science 2525: 472-479, 2002.

http://en.wikipedia.org/Travelling_salesman_problem.

* cited by examiner

VISUAL ATTENTION SYSTEM FOR SALIENT REGIONS IN IMAGERY

PRIORITY CLAIM

This is a Continuation-in-Part application of U.S. Non-Provisional application Ser. No. 12/214,259, filed on Jun. 16, 2008, entitled, "Visual attention and segmentation system."

FIELD OF INVENTION

The present invention relates to a visual attention system and, more particularly, to a system for finding salient or interesting regions in imagery through the generation of saliency maps.

BACKGROUND OF INVENTION

Humans can analyze a scene very quickly and easily, effortlessly noticing objects, even those that the viewer has never seen before. A viewer may be looking for something in particular; this affects how attention is paid within the scene. Natural scenes that a person is likely to encounter on a day to day basis are often very complex, made more so by lighting conditions. People use their own built-in attention without a second thought. Computationally, however, paying attention to a scene and extracting locations or regions of high saliency provides a great challenge. A vision system must be able to determine what locations in a scene draw the most attention, and then segment the attended object so that it can be identified or interpreted.

A number of researchers have shown interest in systems that compute the saliency of a scene. For example, feature-based attention works at the pixel level and computes attention based on the saliency of a given location within the scene at a specific location. The attention work of Itti and Koch (2000) is probably the most well-known algorithm that employs such an approach, which computes attention by constructing a saliency map from a set of biologically inspired features extracted from the image. See L. Itti and C. Koch, A saliency-based search mechanism for overt and covert shifts of visual attention, *Vision Research,* 40: 1489-1506, 2000.

The work of Itti and Koch (2000) has been modified to incorporate top-down biasing of the attention in the work of Navalpakkam and Itti (2005 and 2006). See V. Navalpakkam, L. Itti, Modeling the Influence of Task on Attention, *Vision Research,* 45: 205-231, 2005; and V. Navalpakkam, and L. Itti, An integrated model of top-down and bottom-up attention for optimal object detection, In: *Proc. IEEE Conference on Computer Vision and Pattern Recognition (CVPR),* 1-7, 2006. The algorithm described by Navalpakkam and Itti (2005 and 2006) breaks apart the image into a set of Gaussian pyramids corresponding to color, intensity, and orientation at a series of scales, which are combined across scales and merged into the saliency map. The system attends to the point that corresponds to the maximum value in the saliency map, applies inhibition of return to that location, and shifts to the next most salient point. This process continues until the program attends to a maximum number of locations, or the user terminates the program. The most significant problem with this method is its inefficiency; it needs to compute the entire image before returning a saliency map or salient locations. Other feature-based saliency methods use a similar approach, but may differ in the types of features or number of levels of Gaussian pyramids used in the algorithm.

Attempts to parallelize the above saliency map computation for the image have been restricted to computing different features on different processors and then combining them in the end. Therefore, with or without parallelization, the entire image needs to be processed before a saliency map is available. Thus, if an application needs salient regions quickly, the above methods will fail. A simplistic approach of computing saliency on parts of the image and just tiling them together will not work because the resulting maps are local saliency maps that do not reflect the global saliency map.

In the publications by Draper and Lionelle (2003) and Orabona et al. (2005), the researchers have described the creation of object-based saliency (or attention) algorithms. See B. Draper and A. Lionelle, Evaluation of Selective Attention under Similarity Transforms, In *Workshop on Performance and Attention in Computer Vision*. Graz, Austria, April 2003; and F. Orabona, G. Metta, and G. Sandini, Object-based Visual Attention: A Model for a Behaving Robot, In $3^{rd}$ *International Workshop on Attention and Performance in Computational Vision (in CVPR* 2005), San Diego, Calif., June 2005. Such systems are computationally expensive and must process the entire image before a saliency map can be generated.

An alternative to processing the entire image would be to develop parallel versions of the algorithms described above. For example, one way to parallelize the algorithms would be to compute different features on different processors and then combine the features. Such a process would have the same limitation as feature-based methods and would not give a parallel or recursive saliency method.

Attempts to parallelize the saliency map computation for the image have been restricted to computing different features on different processors and then combining them in the end. With or without parallelization, the entire image needs to be analyzed and only then is a saliency map available. Thus, previous methods of finding salient or interesting regions have two main shortcomings: (1) they need to process the entire image before the saliency map can be outputted, and (2) they are very slow for large images.

Therefore, a continuing need exists for a system that provides a fast method for finding interesting regions in large-sized imagery and video without the need to process the entire image before obtaining results.

SUMMARY OF INVENTION

The present invention is a fast method for finding salient or interesting regions (i.e., generating a global saliency map) in large-sized imagery and video without the need to process the entire image before obtaining results. In generating the global saliency map, the method includes acts of receiving an input image of a scene and dividing the image into a plurality of image sub-regions. Each sub-region has a coordinate position within the image such that the sub-regions collectively form the input image. A plurality of local saliency maps are generated based on a progressively updated global normalization factor, where each local saliency map is based on a corresponding sub-region and a coordinate position representative of the corresponding sub-region. Finally, the plurality of local saliency maps is combined according to each of their coordinate positions to generate the single global saliency map of the input image of the scene.

The global saliency map can be generated through either a parallel or a recursive process. Further details of the parallel process are as follows. A sub-region of the input image is first selected. Then, a feature map for the sub-region is generated. A normalization factor for the sub-region is then generated using the generated feature map and all prior generated feature maps. At least one local normalized feature map can then be generated from the at least one feature map and the normalization factor. A local conspicuity map can then be generated from the at least one local normalized feature map. The at least one local conspicuity map is then combined into an at least one local saliency map of the sub-region. The operations above are then repeated until the local saliency maps have been generated for the entire input image. Finally, the plurality of local saliency maps are then combined according to each of their coordinate positions to generate a single global saliency map of the input image of the scene.

With respect to the recursive process, further details are as follows. A first sub-region of the input image is selected, where the sub-region has a coordinate position within the image. Feature maps of the sub-region are then generated. A normalization factor is then generated for the first sub-region using the generated feature maps. Approximate local normalized feature maps are then generated from its feature maps and the computed normalization factor. Approximate local conspicuity maps are then generated from the local normalized feature maps. The approximate local conspicuity maps are the combined into an approximate local saliency map of the first sub-region. A next sub-region of the input image is then selected (the next sub-region having a coordinate position within the image). Feature maps are then generated of the next sub-region. An updated normalization factor is then generated for the next sub-region using the generated feature maps and the normalization factors of all previous sub-regions. Approximate local normalized feature maps are then generated from its feature maps and the updated normalization factor. Local conspicuity maps are thereafter generated from the local normalized feature maps. The local conspicuity maps are then combined into an approximate local saliency map of the next sub-region. The acts of selecting a next sub-region through generating local conspicuity maps are then repeated until the approximate local saliency maps have been generated for the entire input image. The updated normalization factor after all sub-regions have been processed is called the "final" updated normalization factor. Finally, the plurality of approximate local saliency maps is then combined according to each of their coordinate positions to generate a single approximate global saliency map of the input image of the scene.

Further, the approximate global saliency map can be regenerated as an "exact" global saliency map as follows. For each sub-region, a local normalized feature map is generated from its feature map and the "final" updated normalization factor, resulting in a plurality of local normalized feature maps. Again, for each sub-region, a local conspicuity map is generated from the local normalized feature maps. The local conspicuity maps are then combined into a single local saliency map for each sub-region, resulting in a plurality of local saliency maps. Finally, the plurality of local saliency maps is then combined to generate the single global saliency map.

In another aspect, the local saliency maps are updated with the updated normalization factors.

In yet another aspect, the local saliency maps are updated recursively as the updated normalization factors become available.

Additionally, in receiving the input image, if the input image is a black and white static image, the black and white static image is further converted into an RGB color format.

Finally, as can be appreciated by one skilled in the art, the present invention also comprises a system and computer program product. The computer program product comprises computer-readable instruction means stored on a computer-readable medium that are executable by a computer having a processor for causing the processor to perform the operations described herein. Alternatively, the system includes a processor and memory that are configured to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
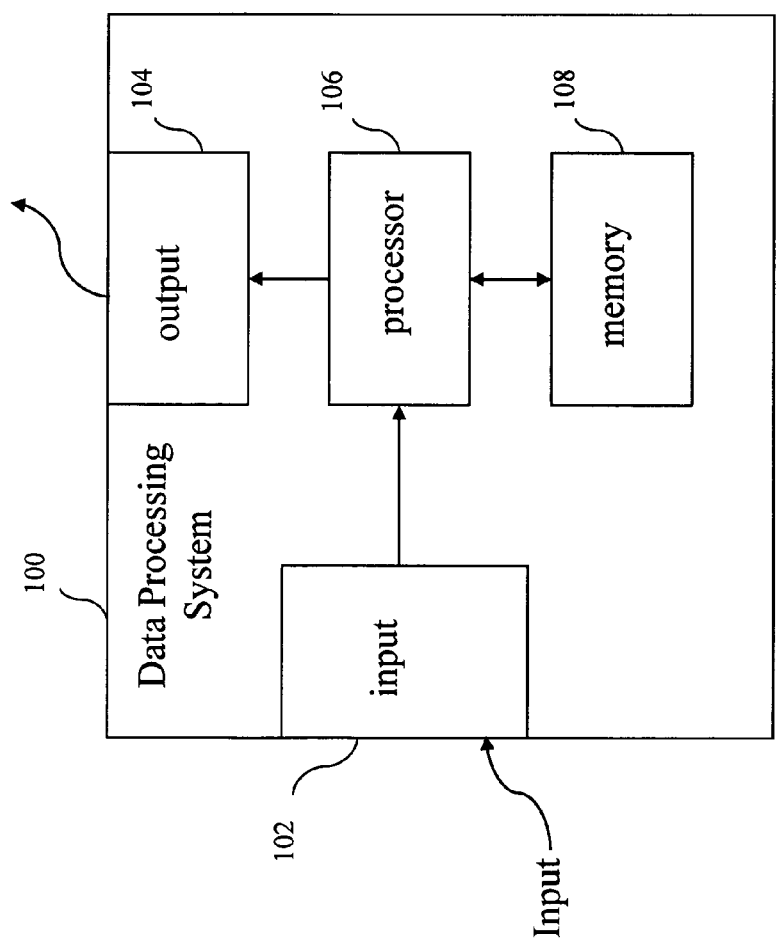
FIG. 1 is a block diagram depicting the components of a visual attention system of the present invention.

The present invention relates to a visual attention system and, more particularly, to a system for finding salient or interesting regions in imagery through the recursive generation of saliency maps. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C.

Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Finally, specific details of the present invention are provided to give an understanding of the specific aspects.

(1) Glossary

The following glossary is intended to provide the reader with a general understanding of the intended meaning of the terms, but is not intended to convey the entire scope of each term. Rather, the glossary is intended to supplement the rest of the specification in more accurately explaining the terms used.

Attention—The term "attention" as used with respect to this invention generally indicates a queuing procedure based on anomaly detection in a scene. An anomaly can be any aspect of the scene that contrasts with its surrounding areas for any reason (e.g., inconsistent textures, colors, or motions). For example, parts of the scene that are highly anomalous relative to the rest of the scene have high rank in this queue, while parts of the scene that "blend in" tend to have lower ranks.

Conspicuity Map—The term "conspicuity map" as used with respect to this invention generally indicates a spatial representation of anomaly detection (based on some saliency algorithm) for a single feature (e.g., intensity, color, orientation) combined across spatial scales. A single conspicuity map is produced for each feature, which are combined into the saliency map (described below).

Feature Map—The term "feature map" as used with respect to this invention generally indicates a spatial representation of anomaly detection for a single feature at a single spatial scale. Feature maps corresponding to a single feature at a range of spatial scales combine to create a conspicuity map.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Saliency Map—The term "saliency map" as used with respect to this invention generally means a spatial representation of the attention queue within a scene. Each spatial location (in two-dimensional image space) is assigned a value according to a saliency algorithm; these locations are ranked into the attention queue.

(2) Principal Aspects

The present invention has three "principal" aspects. The first is a visual attention system. The visual attention system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a visual attention system of the present invention is provided in FIG. 1. The visual attention system 100 comprises an input 102 for receiving information from at least one sensor for use in computing attention. Note that the input 102 may include multiple "ports." Typically, input is received from at least one sensor, non-limiting examples of which include a camera and/or video image sensors. The input 102 can also receive information from other systems, such as an image or video file already captured by another sensor and/or system. An output 104 is connected with the processor for providing information regarding the presence and/or identity of object(s) in the scene to a display or to other systems in order that a network of computer systems may serve as a visual attention system. Output may also be provided to other devices or other programs; e.g., to other software modules, for use therein. The input 102 and the output 104 are both coupled with a processor 106 (or processors), which may be a general-purpose computer processor or a specialized processor designed specifically for use with the present invention. The processor 106 is coupled with a memory 108 to permit storage of data and software that are to be manipulated by commands to the processor 106. The memory 108 includes instruction means encoded therein that are executable by the processor 106 for causing the processor 106 to perform the operations described herein.

Figure 2:
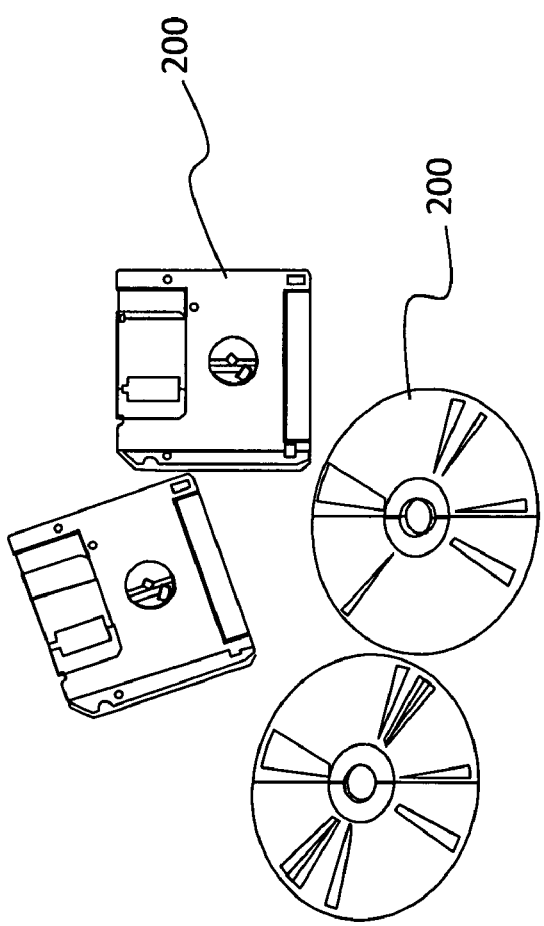
FIG. 2 is an illustration of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

The present invention is a visual attention system for quickly computing attention (i.e., finding salient or interesting regions) in large-sized imagery and video by generating a saliency map. Existing systems for finding salient or interesting regions have two main shortcomings: (1) They need to process the entire image before the saliency map can be outputted; and (2) They are very slow for large images. Attempts to parallelize the saliency map computation for the image have been restricted to computing different features on different processors and then combining them in the end. With or without parallelization, the entire image needs to be analyzed and only then is a saliency map is available.

The present invention improves upon the prior art by providing (1) a fast, parallel saliency approach, and (2) a paradigm for recursively computing saliency in large imagery/video. Thus, the present invention provides a new approach for estimating saliency where parts of the image (i.e., sub-regions) are analyzed in parallel or in sequence to provide an approximate saliency map for these parts immediately.

Breaking a larger image into constituent components provides two key advantages not found in other systems: first, one can easily distribute the computation of the global saliency map by assigning a single tile to each computational node, and second, one can compute a saliency map for a scene simultaneously as data is collected. This minimizes the length of time between the collection of image data and the generation of a final saliency map.

As more of the image sub-regions are analyzed, the saliency map of the previously analyzed sub-regions as well as newly analyzed sub-regions becomes more exact. In the end, an exact global saliency map of the entire image is available. This approach and system can be used as a front-end to a larger system that includes object recognition and scene understanding modules that are cued by the detected saliency map or regions of interest for identification.

The saliency computation can be performed in a default, bottom-up manner or a directed, top-down manner which will assign a preference to certain features over others. One can apply this system to any static scene, whether that is a still photograph or an image captured from video. In addition, the present invention can be applied to both feature-based and object-based saliency methods.

This invention is useful for any application that monitors a scene for the purpose of finding interesting or unusual regions or occurrences. For example, it can be employed to search and rescue operations or in surveillance applications where any activity is an unexpected occurrence, such as in a desert or mountain range, or on the open sea. Other examples of potential applications include automotive safety, factory safety and efficiency, autonomous systems, robotics, intelligence analysis, et cetera.

(4) Specific Details of the Invention

As noted above, the present invention provides a visual attention system that can generate a saliency map using one of two processes: (1) parallel computation of a saliency map (parallel process), and (2) a just-in-time availability of an approximate saliency map of part of an image (recursive process). For clarity, the parallel process will be described first with the recursive process thereafter described.

(4.1) Parallel Process

Figure 3:
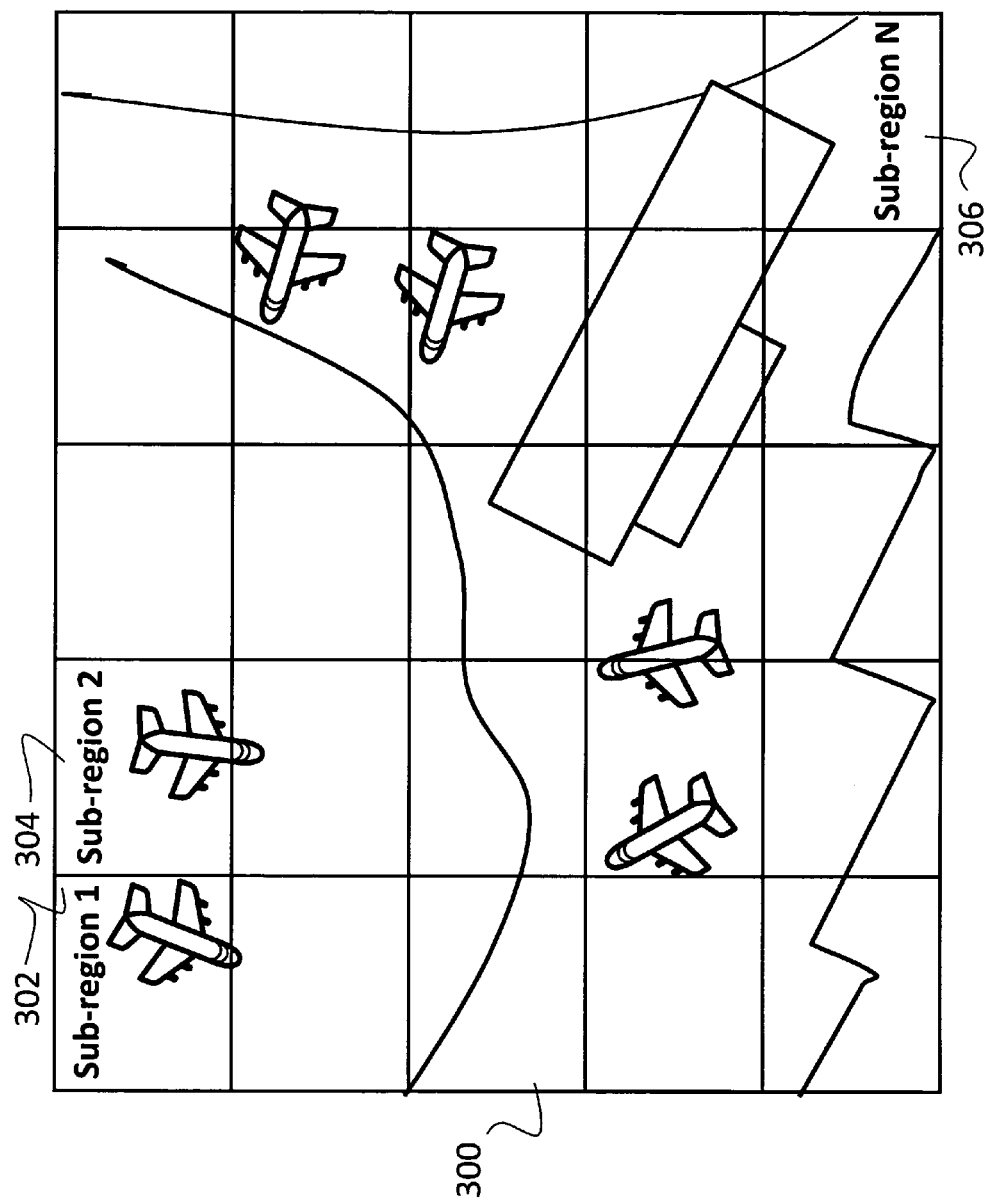
FIG. 3 is an illustration representative of an image whose saliency map can be computed by the present invention.

To generate a saliency map, the system requires an input image that has been appropriately processed. For example, FIG. 3 illustrates an illustration 300 that is intended to represent an image collected from an aerial imaging sensor. As a non-limiting example, the image could be of a size of 1312× 924 pixels. For illustrative purposes, a visual saliency map will be generated for the image depicted in FIG. 3. Both of the processes (i.e., recursive process or parallel process) accept input in the form of a static color image of a scene containing one or more objects. This image can be a photograph or a frame captured from a video stream. If black and white images are presented as input to the module, they are converted to an RGB color format (although they are still black and white images). However, unlike prior saliency map-generating algorithms, the input to the present invention is a series of "tile" images, which correspond to different regions of a larger image; the final (global) saliency map will be computed for this large image. For example, the image 300 can be broken into different sub-regions, such as sub-region one 302, sub-region two 304, through sub-region N 306 (where each sub-region corresponds to an image tile). While uniform tiles are a convenient method to break the large image into small regions, the present invention can work just as well for arbitrarily sized and shaped tiles.

In general, feature maps and normalization values are computed for each image tile (i.e., sub-region) and combined with each other to generate master feature maps. The master feature maps are normalized across all maps which are then combined into a global saliency map that represents the contributions of all image sub-regions. However, as noted above and as illustrated in FIGS. 4A and 4B, the present invention provides two processes for generating a global saliency map.

Figure 4A:
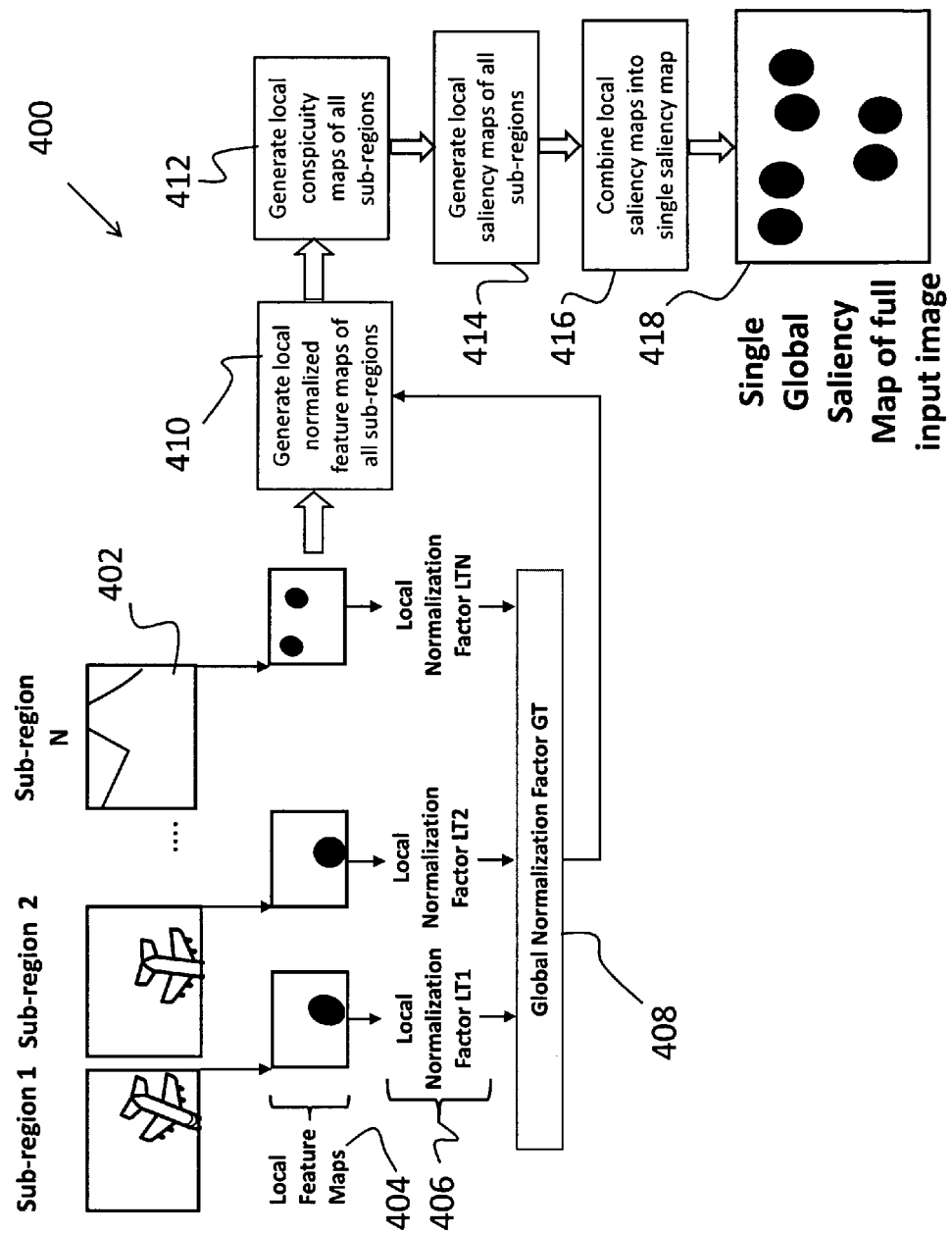
FIG. 4A is a schematic diagram for fast computation of saliency in large images using a parallel saliency process.

FIG. 4A is a schematic diagram for computation of saliency using a parallel saliency process 400 where the local normalization values are obtained from all image sub-regions before being combined. Initially, an input image of a scene is received by the system. The image is then divided into a plurality of sub-regions 402. Each sub-region 402 has a coordinate position within the larger image such that the sub-regions (or image tiles) collectively form the input image (this is illustrated in FIG. 3). Feature maps 404 are then generated for each sub-region 402. Thereafter, a normalization factor 406 is computed for each image sub-region using the generated feature map. A global normalization factor 408 is then computed from the normalization factors of all image sub-regions.

Next, for each sub-region, a local normalized feature map 410 is generated from its feature map 404 and the computed global normalization factor 408, resulting in a plurality of local normalized feature maps. Additionally, for each sub-region, a local conspicuity map 412 is computed from the local normalized feature maps 410. Next, local saliency maps 414 are computed for all sub-regions by combining the local conspicuity maps into a single local saliency map for each sub-region. Finally, each of the plurality of local saliency maps are combined 416 according to their individual coordinate position to generate a single global saliency map 418 of the input image of the scene.

Thus, using the parallel saliency process, each image sub-region can be sent to a separate processor (or processed together in the same processor) for processing and the results from all processors are combined in a single step to generate a final saliency map. The parallel system employs distributed computations to compute the feature maps and normalization values for each sub-region individually and simultaneously. This breaks up the most intensive portion of the computational load into manageable segments that can be carried out very quickly. The feature maps are then combined using relatively inexpensive addition and normalization operations and the final saliency map is produced.

As noted above, the present invention includes several acts to arrive at the global saliency map. For further understanding, each of the acts is described in further detail below.

(4.1.1) Generating Local Feature Maps

Initially, the features for each sub-region are evaluated individually. Many different methods exist for extracting features from an image, non-limiting examples of which include the processes described by Itti and Koch (1998 and 2000), Draper and Lionelle (2003), and Orabona et al. (2005), which all work well and are incorporated by reference as though fully set forth herein (see the Background of Invention section for full citations). As can be appreciated by one skilled in the art, the techniques described in the cited prior art can be used effectively to generate the local feature maps.

As a non-limiting example, a pair of intensity channels, L and D (light and dark), is calculated from the input image by averaging the red (r), green (g), and blue (b) channels: L=(r+g+b)/3 and D=255−L. Four fully-saturated color channels are then created (red (R), green (G), blue (B), and yellow (Y)) that yield zero-response to white, effectively separating the effects of the color and intensity channels:

$$R = r - \frac{(g+b)}{2}, \; G = g - \frac{(r+b)}{2},$$
$$B = b - \frac{(r+g)}{2}, \; \text{and} \; Y = \frac{(r+g)}{2} - \frac{|r-g|}{2} - b.$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature at multiple scales that correspond to multiple pairings of center and surround regions. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

Thus, the procedure described above results in six feature maps at each center-surround scale:

$$\{E_{RG}(x,y), E_{GR}(x,y), E_{BY}(x,y), E_{YB}(x,y), E_{LD}(x,y), E_{DL}(x,y)\}$$

(4.1.2) Generating a Normalization Factor:

Several different techniques can be used to generate the normalization factor. However, for the purposes of computing and combining saliency maps from disparate regions in the image, a method must be used that allows merging of the normalization factors across the different sub-regions. For this purpose, a normalization approach based on the analysis of the maxima is employed.

For each feature map at each center-surround scale, the number and heights of the peaks are computed, which is required for normalization once all of the feature maps from the image sub-regions are combined. For the feature map at the $i^{th}$ center-surround scale, the maximum peak value is determined and stored in the variable peak_max$_i$. The number of local maxima and their mean is stored in variables called peak_num$_i$ and peak_mean$_i$, respectively. This procedure is carried out for each feature map at each scale.

Aside from the convolution operations required to generate the feature maps, systematically pinpointing the peaks in each feature map is the second most computationally expensive operation encountered in the process. Therefore, including this computation within the distributed stage of the program dramatically improves its speed and efficiency.

(4.1.3) Generating a Global Normalization Factor

After the feature maps for each sub-region have been generated and their local normalization factors computed, the system assembles the sub-regions for each feature map according to their location in the image and performs normalization across the newly-formed large feature maps. This is carried out by computing the mean and maximum peak heights for the entire feature map based on the values of its N constituent sub-regions using:

$$\text{peak\_mean} = \frac{\sum_{i=1}^{N} \{\text{peak\_mean}_i \times \text{peak\_num}_i\}}{\sum_{i=1}^{N} \text{peak\_num}_i},$$

$$\text{and peak\_max} = \max_i \{\text{peak\_max}_i\},$$

where peak_num$_i$ corresponds to the number of peaks in the $i^{th}$ sub-region, and peak_mean and peak_max represent the mean and maximum peak value for their individual sub-regions. At the end of this step, each feature at each sub-region in the image will have its own global normalization factor.

(4.1.4) Generating Local Normalized Feature Maps of all Sub-Regions

In general, maps are combined through alternating steps of combination and normalization. To compute the local feature maps, one must first combine all of the feature maps that correspond to a single feature class (e.g., color, intensity, orientation, et cetera) at a single spatial location across center-surround scales. This can be carried out by simple linear summation or by some more complex procedure.

The normalization step proceeds very quickly, since the maximum and mean values are computed in parallel for the individual sub-regions. For example, normalization is carried out by multiplying each pixel in all feature maps by $$(\text{peak\_max} - \text{peak\_mean})^2$$

from the appropriate global normalization factor (to create a constant of normalization). At this stage, the local normalized feature maps correspond to each feature for every unique spatial location (sub-region) in the original image.

(4.1.5) Generating Local Conspicuity Maps

Once the normalized feature maps have been computed, one can begin the final process of combining these new, full feature maps into a saliency map. The procedure for condensing the local feature maps into local conspicuity maps follows a similar methodology to the step that created the local feature maps. This process is computationally light, consisting of a series of additions and normalizations between the multiple feature maps.

This begins by combining the array of feature maps into a series of local conspicuity maps; local feature maps that correspond to the same spatial location (sub-region) in the original image are combined across features. Likewise, the global normalization factors are updated using the same formulae in (4.1.3), except that instead of combining across center-surround scales, the value of the index element, i, corresponds to the $i^{th}$ feature map at a given spatial location. Normalization of each conspicuity map is carried out using these updated global normalization factors according to the formula in (4.1.4). For feature classes that contain multiple channels, such as color, an additional combination and normalization step is required to produce the conspicuity maps.

(4.1.6) Generating Local Saliency Maps

Finally, the local saliency maps are generated for all sub-regions by combining each of the local conspicuity maps that correspond to a given spatial location (each corresponding to a single feature) by simple summation and normalizing the map. This normalization can either be local, using the peak_max and peak_mean variables from each local map individually, which produces an approximation to the true saliency map (i.e., that which would have been computed for that region from the entire image), or a global normalization, which uses the peak_mean and peak_max values across the local conspicuity maps at all spatial locations. By using the global normalization factor, the resulting saliency map is a match to the "true" saliency map.

(4.1.7) Generating a Single Saliency Map

Finally, each of the plurality of local saliency maps are combined according to their individual coordinate positions to generate a single global saliency map of the input image of the scene. More specifically, saliency maps are pieced together according to the coordinate position within the image from which the saliency map was generated and represents. The saliency maps individually act as tiles that collectively form the global saliency map.

When piecing saliency maps together to form the global saliency map, it may be that a dark line that forms in the saliency map that appears at the seam between the two image sub-regions. This is caused as a result of the two-dimensional convolution between the image and the Gaussian kernel in regions near the edge of the image. For pixels near the edge of the image, the convolution kernel "overflows" the image space; these outside pixels are assumed to have zero value, which causes the convolved pixel to have a lesser value than if there were nonzero values at those pixels. In the original image, the pixels at the center of the image, near the seam, always have a neighbor—the convolution kernel does not overflow the image. However, the existence of an edge in each of the sub-regioned images darkens the border pixels and can produce a dark line when the feature maps are recombined. This can be remedied by overlapping the sub-regions on the seam-side by a known number of pixels, computing the feature maps for each of these oversized sub-regions, and then discarding the overlapped information when the sub-regioned feature maps are combined into the global feature map.

(4.2) Recursive Process

Figure 4B:
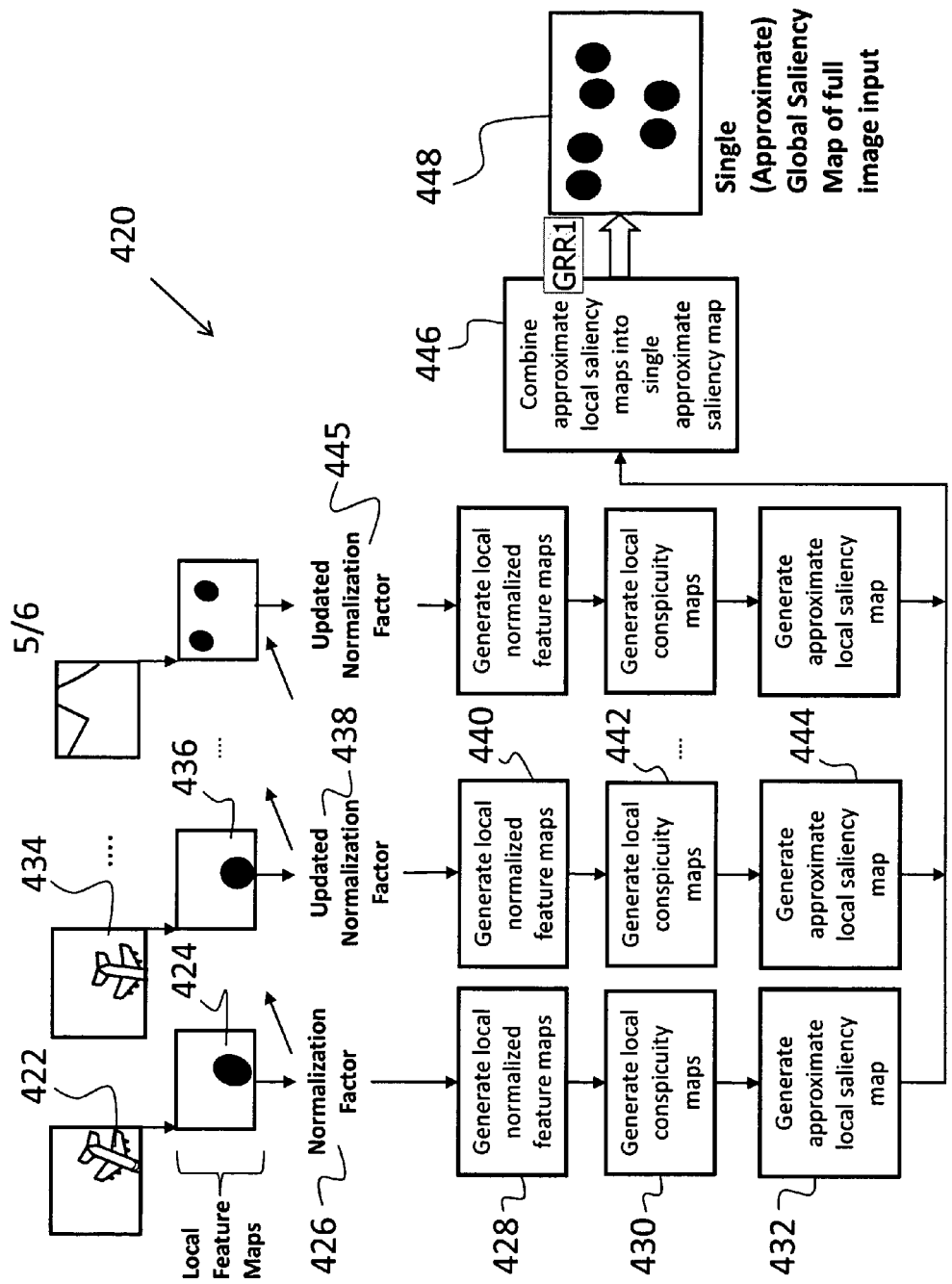
FIG. 4B is a schematic diagram for fast computation of saliency in large images using a recursive saliency process.

As noted above, the present invention also provides a recursive process to generate the saliency map. FIG. 4B is a schematic diagram for computation of saliency using the recursive saliency process 420 where normalization maps from each image sub-region are used as inputs to a subsequent image sub-region.

As was the case with respect to the parallel process, an input image of a scene is initially received by the system. A first sub-region 422 of the input image is then selected. Again, each sub-region has a coordinate position within the input image. Feature maps 424 of the first sub-region are then generated. Thereafter, a normalization factor 426 is generated for the first sub-region using the generated feature maps 424. Next, approximate local normalized feature maps 428 are computed from the feature maps 424 and the computed normalization factor 426. Approximate local conspicuity maps 430 are then computed from the local normalized feature maps 428. The approximate local conspicuity maps are then combined into an approximate local saliency map 432 of the first sub-region.

In accordance with the recursive process, a next sub-region 434 of the input image is selected. Feature maps 436 are then generated of the next sub-region 434. An updated normalization factor 438 is computed for the next sub-region 434 using the generated feature maps 436 and the normalization factors of all previous sub-regions (e.g., normalization factor 426).

Next, approximate local normalized feature maps 440 are computed from the feature maps 436 and the updated normalization factor 438. Local conspicuity maps 442 are then computed from the local normalized feature maps. The local conspicuity maps are then combined into an approximate local saliency map 444 of the next sub-region. The recursive procedure above can be repeated until the approximate local saliency maps have been computed for the entire input image.

In this case, the updated normalization factor after all sub-regions have been processed is called the "final" updated normalization factor 445. Finally, the plurality of approximate local saliency maps are combined 446 according to their coordinate positions to generate a single approximate global saliency map 448 of the input image of the scene.

It should be noted that in the recursive process, the term "approximate" is used to indicate that the items are accurate up to a constant of normalization (which is described above with respect to the steps for normalization) and are increasingly accurate as the normalization factor is updated to reflect additional sub-regions within the image. For example, an "approximate saliency map" is a saliency map that has been normalized by an incomplete normalization factor (i.e., one that has not yet incorporated information from all sub-regions within the image).

The saliency map can be formed as an "exact" saliency map (which would mirror that produced by the Parallel Process) as follows. For each sub-region, a local normalized feature map is generated from its feature map and the "final" updated normalization factor, resulting in a plurality of local normalized feature maps. Additionally, for each sub-region, a local conspicuity map is generated from the local normalized feature maps. The local conspicuity maps are then combined into a single local saliency map for each sub-region, resulting in a plurality of local saliency maps. Finally, the plurality of local saliency maps are combined to generate the single global saliency map that is identical to that produced by the Parallel Process.

Figure 5:
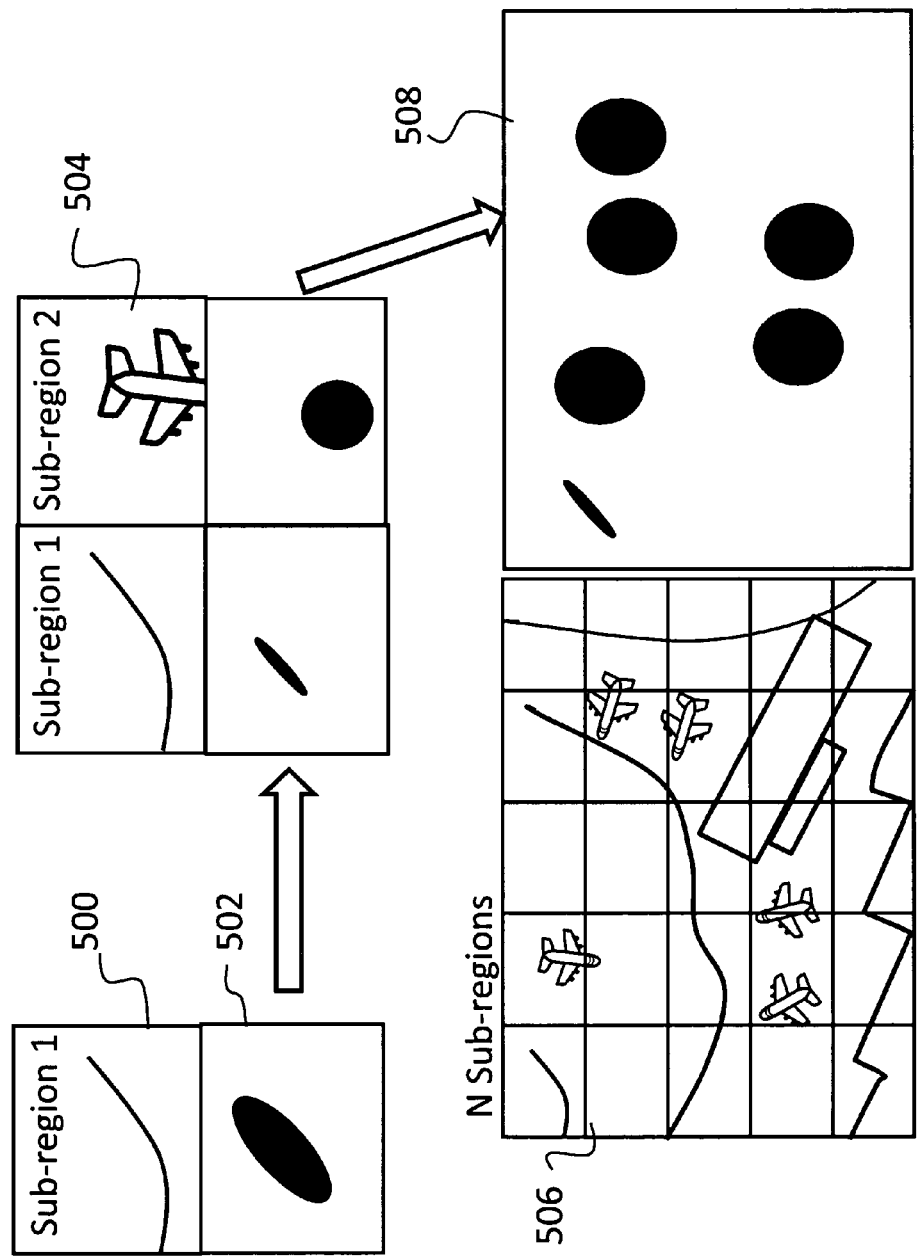
FIG. 5 is an illustration depicting the sequential application of the present invention as additional tiles of image data are incorporated into the existing attention information, such that after all N tiles are processed, the result is the final saliency map.

FIG. 5 illustrates the evolution of the saliency map as new image sub-regions are introduced to the system. For example, with a first sub-region 500, a first local saliency map 502 is generated. At first, some relatively inconspicuous features appear very salient in the first local saliency map 502. However, as new sub-regions are added (e.g., second sub-region 504), the attention shifts away from these "boring" regions and toward newer salient areas. At the end of the process, when all image sub-regions (e.g., N sub-regions 506) have been processed, the final saliency map 508 matches that obtained from the parallel implementation.

Thus, using the recursive process, the normalization from the previous image tile (i.e., sub-region) is combined with the current sub-region normalization values to yield a better estimate of the global normalization. This process is repeated until all image sub-regions have been processed. A one step correction can be applied to all image sub-regions in the end to come up with the global saliency map. In this process, only some of the data is available at the time that the computation starts. A single computer processes new images sub-regions as they are collected and computes new feature maps and combines them with the previously-computed maps "on the fly" as data is collected, and computes a series of intermediate (i.e., approximate) saliency maps. When images sub-regions have been collected for all regions in the scene, the final global saliency map is provided.

The processes employed for the parallel and recursive implementations of this system are very similar; the difference in these implementations lies with the order that the parts are applied and a final one-step correction for the recursive case. For example, the parallel implementation requires one to extract the feature and normalization data for each sub-region before combining them and proceeding to the cascade of combination and normalization operations that yield the saliency map. However, the recursive implementation does not wait for the feature maps for all sub-regions to be computed, and iteratively proceeds through the combination and normalization stage each time data for a new sub-region is collected. Essentially, this is a two-sub-region process, where each new sub-region is combined with a grouping of sub-regions saved from the previous iteration. After this new sub-region is combined with the others, this new assembly becomes the grouping to which the next sub-region is added. In this way, the same modules can be employed to solve two distinctly different problems.

What is claimed is:

1. A computer implemented method for combining salient regions in imagery, comprising an act of causing a processor to perform acts of:
   receiving an input image of a scene;
   dividing the image into a plurality of image sub-regions, each sub-region having a coordinate position within the image such that the sub-regions collectively form the input image;

generating a plurality of local saliency maps based on a progressively updated global normalization factor, each local saliency map being based on a corresponding sub-region; and combining the plurality of local saliency maps according to each of their coordinate positions to generate a global saliency map of the input image of the scene.

2. The method as set forth in claim 1, wherein the act of generating local saliency maps thither comprises acts of:
   a. selecting a sub-region of the input image, the sub-region having a coordinate position within the image;
   b. generating at least one feature map of the sub-region;
   c. generating a normalization factor for the sub-region using the at least one generated feature map and all prior generated feature maps;
   d. generating at least one local normalized feature map from the at least one feature map and the normalization factor;
   e. generating at least one local conspicuity map from the at least one local normalized feature map;
   combining the at least one local conspicuity nap into an at least one local saliency map a the sub-region;
   g. repeating, acts (a) through (f) until the local saliency maps have been generated for the entire input image; and
   h. combining, the plurality of local saliency maps according, to each of their coordinate positions to generate a single global saliency map of the input image of the scene.

3. The method as set forth in claim 2, further comprising an act of updating the local saliency maps with the updated normalization factors.

4. The method as set forth in claim 3, wherein the act of updating the local saliency maps is performed recursively as the updated normalization factors become available.

5. The method as set forth in claim 1, further comprising an act of updating the local saliency maps with the updated normalization factors.

6. The method as set forth in claim 5, wherein the act of updating, the local saliency maps is performed recursively as the updated normalization factors become available.

7. The method as set forth in claim 1, farther comprising acts of:
   for each sub-region, generating a local normalized feature map from its feature map and the "final" updated normalization factor, resulting in a plurality of local normalized feature maps;
   for each sub-region, generating a local conspicuity map from the local normalized feature maps;
   combining the local conspicuity maps into a single local saliency map for each sub-region, resulting in a plurality of local saliency maps; and
   combining the plurality of local saliency maps to generate the single global saliency map.

8. The method as set forth in claim wherein in receiving the input image, if the input image is a black and white static image, the black and white static image is further convened into an RGB color format.

9. The method as set forth in claim 1, further comprising acts of:
   generating a feature map for each sub-region;
   generating a normalization factor for each sub-region using the generated feature map;
   generating a global normalization factor from the normalization factors of all sub-regions;

for each sub-region, generating a local normalized feature map from its feature map and the global normalization factor, resulting in a plurality of local normalized feature maps;
for each sub-region, generating a local conspicuity map from the local normalized feature maps;
combining the local conspicuity maps into a single local saliency map for each sub-region, resulting in a plurality of local saliency maps; and
combining the plurality of local saliency maps to generate the single global saliency map.

10. A computer program product for finding salient regions in imagery, the computer program product comprising computer-readable instruction means stored on a non-transitory computer-readable medium that are executable by a computer having a processor for causing the processor to perform operations of:
   receiving an input image of a scene;
   dividing the image into a plurality of image sub-regions, each sub-region having a coordinate position within the image such that the sub-regions collectively form the input image;
   generating a plurality of local saliency maps based on a progressively updated global normalization factor, each local saliency map being based on a corresponding sub-region; and
   combining the plurality of local saliency maps according to each of their coordinate positions to generate a global saliency map of the input image of the scene.

11. The computer program product as set forth in claim 10, wherein in generating local saliency maps, the computer program product further comprises instruction means for causing the processor to perform acts of:
   a. selecting a sub-region of the input image, the sub-region having a coordinate position within the image;
   b. generating at least one feature map of the sub-region;
   c. generating a normalization factor for the sub-region using the at least one generated feature map and all prior generated feature maps;
   d. generating at least one local normalized feature map from the at least one feature map and the normalization factor;
   e. generating at least one local conspicuity map from the at least one local normalized feature map;
   f. combining the at least one local conspicuity map into an at least one local saliency map of the sub-region;
   g. repeating acts (a) through (f) until the local saliency maps have been generated for the entire input image; and
   h. combining the plurality of local saliency maps according to each of their coordinate positions to generate a single global saliency map of the input image of the scene.

12. The computer program product as set forth in claim 11, further comprising instruction means for causing the processor to perform an operation of updating the local saliency maps with the updated normalization factors.

13. The computer program product as set forth in claim 12, wherein the operation of updating, the local saliency maps is performed recursively as the updated normalization factors become available.

14. The computer program product as set forth in claim 10, further comprising instruction means for causing the processor to perform an operation of updating the local saliency maps recursively with the updated normalization factors as the updated normalization factors become available.

15. The computer program product as set forth in claim 10, further comprising instruction means for causing the processor to perform operations of:

for each sub-region, generating a local normalized feature map from its feature map and the "final" updated normalization factor, resulting in a plurality of local normalized feature maps;

for each sub-region, generating a local conspicuity map from the local normalized feature maps;

combining the local conspicuity maps into a single local saliency map for each sub-region, resulting in a plurality of local saliency maps; and combining the plurality of local saliency maps to generate the single global saliency map.

16. The computer program product as set forth in claim 10, wherein in receiving the input image, if the input image is a black and white static image, the black and white static image is further converted into an RGB color format.

17. The computer program product as set forth in claim 10, further comprising instruction means for causing the processor to perform operations of:

generating, a feature map for each sub-region;

generating, a normalization factor for each sub-region using the generated feature map;

generating a global normalization factor from the normalization factors of all sub-regions;

for each sub-region, generating a local normalized feature map from its feature map and the global normalization factor, resulting in a plurality of local normalized feature maps;

for each sub-region, generating a local conspicuity map from the local normalized feature maps;

combining the local conspicuity maps into a single local saliency map for each sub-region, resulting in a plurality of local saliency maps; and combining the plurality of local saliency maps to generate the single global saliency map.

18. A system for finding salient regions in imagery, the system comprising a processor coupled with a memory that includes instruction means that are executable by the processor for causing the processor to perform operations of:

receiving an input image of a scene;

dividing the image into a plurality of image sub-regions, each sub-region having a coordinate position within the image such that the sub-regions collectively form the input image;

generating a plurality of local Saliency maps based on a progressively updated global normalization factor, each local saliency map being based on a corresponding sub-region; and combining the plurality of local saliency maps according to each of their coordinate positions to generate a global saliency map of the input image of the scene.

19. The system as set forth in claim 18, further comprising instruction means for causing, the processor to perform operations of:

a. selecting a sub-region of the input image, the sub-region having a coordinate position within the image;

b. generating at least one feature map of the sub-region, c. generating a normalization factor for the sub-region using the at least one generated feature map and all prior generated feature maps;

d. generating at least one local normalized feature map from the at least one feature map and the normalization factor;

e. generating at least one local conspicuity map from the at least one local normalized feature map;

f. combining the at least one local conspicuity map into an at least one local saliency map of the sub-region;

g. repeating operations (a) through (f) until the local saliency maps have been generated for the entire input image; and h. combining the plurality of local saliency maps according to each of their coordinate positions to generate a single global saliency map of the input image of the scene.

20. The system as set forth in claim 19, further comprising instruction means for causing the processor to perform an operation of updating, the local saliency maps with the updated normalization factors.

21. The system as set forth in claim 20, wherein the operation of updating the local saliency maps is performed recursively as the updated normalization factors become available.

22. The system as set forth in claim 18, further comprising instruction means for causing the processor to perform an operation of updating the local saliency maps recursively with the updated normalization factors as the updated normalization factors become available.

23. The system as set forth in claim 18, further comprising instruction means for causing the processor to perform operations of:

for each sub-region, generating a local normalized feature map from its feature map and the "final" updated normalization factor, resulting in a plurality of local normalized feature maps;

for each sub-region, generating a local conspicuity map from the local normalized feature maps;

combining, the local conspicuity maps into a single local saliency map for each sub-region, resulting in a plurality of local saliency maps; and combining the plurality of local saliency maps to generate the single global saliency map.

24. The system as set forth in claim 18, wherein in receiving the input image, if the input image is a black and white static image, the black and white static image is further converted into an RGB color format.

25. The system as set forth in claim 18, further comprising instruction means for causing the processor to perform operations of:

generating a feature map for each sub-region;

generating a normalization factor for each sub-region using the generated feature map;

generating a global normalization factor from the normalization factors of all sub-regions;

for each sub-region, generating a local normalized feature map from its feature map and the global normalization factor, resulting in a plurality of local normalized feature maps;

for each sub-region, generating a local conspicuity map from the local normalized feature maps;

combining the local conspicuity maps into a single local saliency map for each sub-region, resulting in a plurality of local saliency imps; and combining the plurality of local saliency maps to generate the single global saliency map.

* * * * *